United States Patent [19]

Ruether et al.

[11] 4,251,881
[45] Feb. 17, 1981

[54] CENTRALIZED AUTOMATIC GAIN CONTROL CIRCUIT

[75] Inventors: Peter G. Ruether, Boulder; Patrick A. Vachon, Arvada, both of Colo.

[73] Assignee: Storage Technology Corporation, Louisville, Colo.

[21] Appl. No.: 912,447

[22] Filed: Jun. 5, 1978

[51] Int. Cl.³ .............................................. H04J 5/00
[52] U.S. Cl. ........................................ 370/98; 370/81
[58] Field of Search ......... 179/15 BL, 15 AS, 15 BP, 179/15 BF; 325/400, 405, 62; 333/16; 370/81, 98; 455/68

[56] References Cited

U.S. PATENT DOCUMENTS 4,009,350   2/1977   Cabet et al. ..................... 179/15 BP Primary Examiner—Bernard Konick
Assistant Examiner—Joseph A. Popek
Attorney, Agent, or Firm—Woodcock, Washburn, Kurtz, Mackiewicz & Norris

[57] ABSTRACT

Disclosed is an automatic gain control circuit for a communications system, such as a time assignment speech interpolation system, which equalizes the loss in each of a plurality of transmission facilities by providing a symbol generator at a remote location for generating a test signal of predetermined amplitude. At a near location, the received test signal is applied to a controlled gain circuit for each facility, which is under the control of a central microprocessor provided with a reference signal for comparing the received test signal against the reference signal. The gain of the controlled gain circuit may be increased or decreased in accordance with the comparison of the received test signal with the reference signal. In one embodiment, the sum of the digital samples of the received test signal is compared against a reference value stored in a digital memory. In the preferred embodiment the stored reference value comprises a low and a high value which define an acceptable amplitude range therebetween. The gain of the controlled gain circuit is increased or decreased if the received test signal is outside of the acceptable range.

13 Claims, 2 Drawing Figures

CENTRALIZED AUTOMATIC GAIN CONTROL CIRCUIT

BACKGROUND OF THE INVENTION

This invention relates in general to an automatic gain control circuit for use in a communication system and in particular it relates to an automatic gain control circuit for use in a time assigned speech interpolation system.

A time assigned speech interpolation or TASI system is a high speed switching and transmission system which uses the idle time (i.e. silence) in telephone calls to interpolate the speech of as many as N talkers onto approximately N/2 transmission facilities. One such system is disclosed in the co-pending application of William A. Morgan, Ser. No. 863,902 filed Dec. 23, 1977, now U.S. Pat. No. 4,153,816, and assigned to the assignee of the present invention. In TASI systems such as the one disclosed therein, if the losses in each of the various transmission facilities are not equal, the volume of a talker's speech signal will vary depending upon the facility over which it has traveled. This volume variation can be objectionable to the listening party.

One possible solution to this problem is to provide an automatic gain control circuit for each of the transmission facilities which equalizes the loss on each. A test signal is generated at the far end of the system and transmitted across each facility to the near end. At the near end, the amplitude of the received signal is compared against a reference signal. If the amplitude of a test signal which has been received after traversing a particular facility is below that of the reference signal, the gain of that facility is increased until the test signal amplitude and the reference signal amplitude are equal to one another. If the amplitude of the received test signal is greater than that of the reference signal, the gain of the facility is decreased until the amplitudes are equal. This procedure is periodically employed for each and every transmission facility.

In providing this automatic gain control circuitry the prior art has typically provided a separate automatic gain control circuit for each and every transmission facility. One problem associated with this arrangement is that a separate reference signal and a separate comparison means are employed for each transmission facility. Since the plurality of reference signals and the plurality of comparison means may vary with respect to one another, the loss of the various facilities may therefore not be equalized. Moreover, if the number of transmission facilities increases, the automatic gain control circuitry required also increases as does the cost and complexity thereof.

It is an object of the present invention to provide an automatic gain control circuit for a time assigned speech interpolation system which equalizes the loss of the various transmission facilities employed therein.

It is a further object of the present invention to provide an automatic gain control circuit for a plurality of transmission facilities in a TASI system which is simple and inexpensive in its design.

SUMMARY OF THE INVENTION

These and other objects of the present invention are achieved by an automatic gain control circuit of the type employing a means at a remote location for generating a test signal of predetermined amplitude. The test signal is selectively applied to each of the transmission facilities. When the test signal is received at a near location, it is directed to a central means for comparing the test signal against a stored reference signal and the gain of a controlled gain circuit is varied in response to this comparison. In the preferred embodiment, the received test signal is digitized and compared to a digital reference value which has been stored in a first memory. In one embodiment the sum of the digital samples of the received test signal is compared against the stored reference value. Moreover, in one embodiment the reference value is comprised of a low and a high value which define an acceptable amplitude range therebetween. The incoming test signal is compared with the reference to determine whether it lies within this acceptable range.

The present invention will be more fully understood by reference to the accompanying drawings in which:

FIG. 1 is a schematic diagram of one terminal of the communication system with which the present invention is employed; and FIG. 2 is a schematic circuit diagram of the incoming facility interface circuit shown in FIG. 1 which comprises the automatic gain control circuit of the present invention.

DETAILED DESCRIPTION OF A PROPOSED EMBODIMENT

Figure 1:
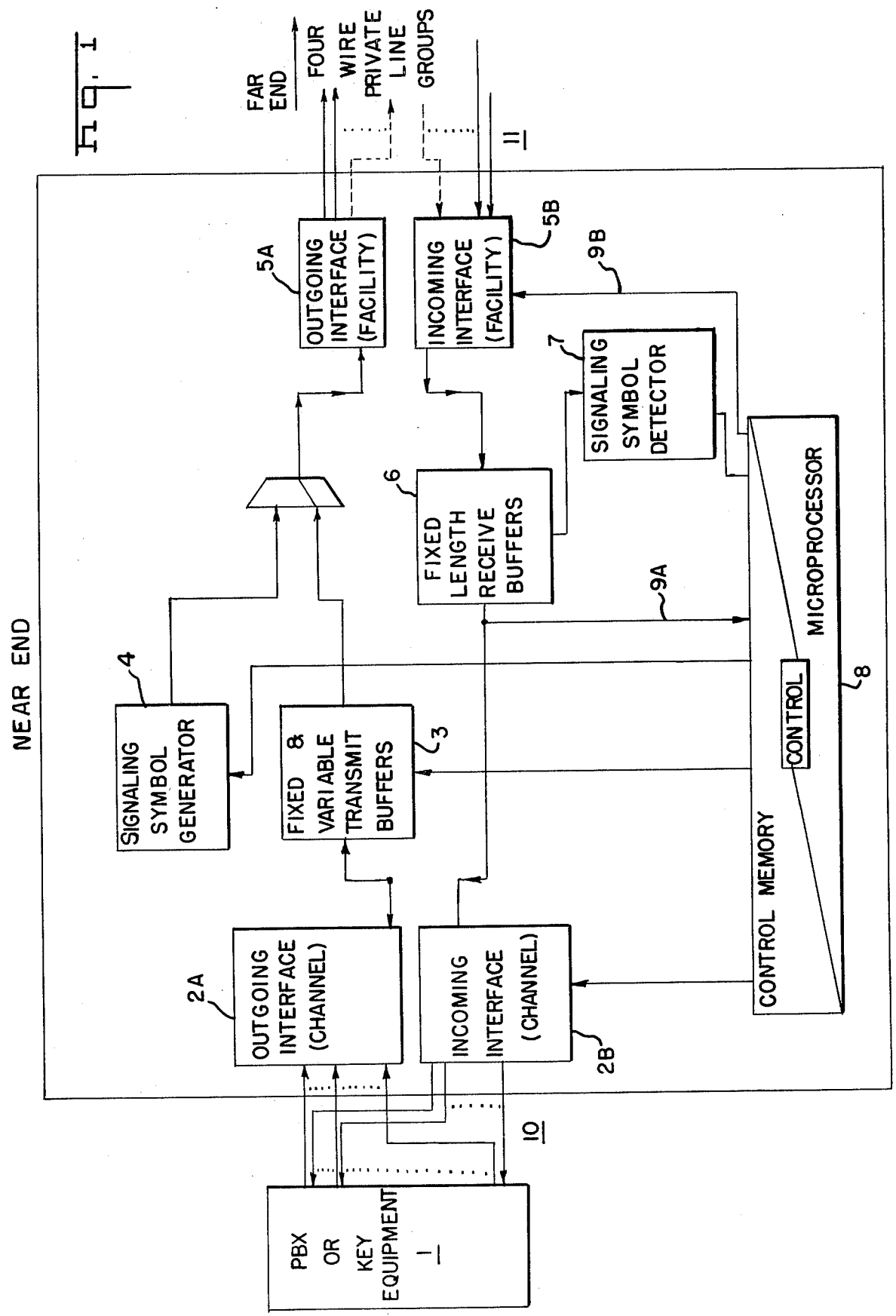

FIG. 1 is a block diagram of one end, referred to here as the "near end", of the overall system to which the present invention is applicable. Subscriber equipment 1, such as PBX or key equipment, is serviced by a private line communication system which includes four wire transmission facilities 11. The subscriber equipment is connected over four wire input channels 10 to the near end of a TASI system which is described in the aforementioned application of William A. Morgan. The transmission facilities 11 are directed to a remote location sometimes called the "far end" at which a circuit similar to that shown in FIG. 1 is located. Those skilled in the art will of course recognize that each of the four wire input channels 10 and four wire transmission facilities 11 comprise two wires for carrying incoming signals to the near end. There are N input channels which will normally be serviced by approximately N/2 transmission facilities. Typically up to 31 input channels will be serviced by up to 16 transmission facilities.

Channel interface circuits are provided between the input channels and the near end terminal of the aforementioned TASI system. Outgoing channel interface circuits 2A include analog to digital converters and a time division switching network for periodically polling each of the input channel to service them in sequence. Fixed and variable transmit buffers 3 are provided. In accordance with the aforementioned Morgan invention, the variable buffers provide temporary storage for the sampled signals if a facility is unavailable. A signalling symbol generator 4 generates a tone signal which is inserted before each speech burst transmitted on a facility to indicate the channel which originated that speech burst, if the speech burst uses a facility not already assigned to that channel. Fixed buffer 3 provides a time interval in which to transmit the tone signal without clipping the input signal.

A signaling symbol generator 4 located at both the near and at the far end of the system, has the capability of generating a plurality of test signals, one of which is used to selectively test the losses in each of the transmission facilities 11.

Both outgoing speech burst and outgoing test signals are connected through outgoing facility interface circuits 5A to the transmission facilities 11. The outgoing interface circuits 5A include digital switching network and digital to analog converters. The output of these digital to analog converters is an analog signal and this analog signal is transmitted across the facilities 11 to the far end.

When incoming speech bursts are received from the remote location they are applied to incoming facility interface circuits 5B. The incoming facility interface circuits 5B comprise a plurality of analog to digital converters and a plurality of controlled gain circuits. An incoming digitized speech burst is temporarily stored in the fixed length receive buffers 6 which provide a time interval in which the symbol detector 7 decodes the tone symbol to determine to which channel 10 the message should be assigned.

The assignment of channels to facilities and the time that a message may be stored in the variable speech buffer is under the control of a control means 8, typically a microprocessor. After the control means 8 determines to which channel 10 an incoming message is assigned, the incoming speech burst is retrieved from the fixed length receive buffer 6 and is applied to that channel through the incoming channel interface circuits 2B. The incoming channel interface circuits 2B comprise a switching network under the control of the control means 8 as well as digital to analog converters.

When the system shown in FIG. 1 is operated in a test mode and a test signal is used to determine the loss of one of the facilities 11, a test signal having a predetermined amplitude is generated as the far end and transmitted to the near end along the facility 11. This test signal may be generated at the far end as follows. Samples of the test signal are stored there in digital form in the signaling symbol generator 4 at the far end. Samples of the test signal are then selectively retrieved and transmitted. When the test signal is received, it is applied to the incoming facility interface circuit 5B and routed from there through the fixed length receive buffer 6 to the central control means 8 along the path 9A. A reference signal is stored at the central control means 8 and test signals arriving from each of the facilities 11 are compared there against this reference signal. If the amplitude of the received test signal from a particular facility is less than the reference signal, a control signal is directed along feedback path 9B to increase the gain of the controlled gain circuit for that facility which is preferably located in the incoming facility interface circuit 5B. If the amplitude of the received test signal from a particular facility is greater than the stored reference signal, the gain of the controlled gain circuit for that facility is reduced.

Figure 2:
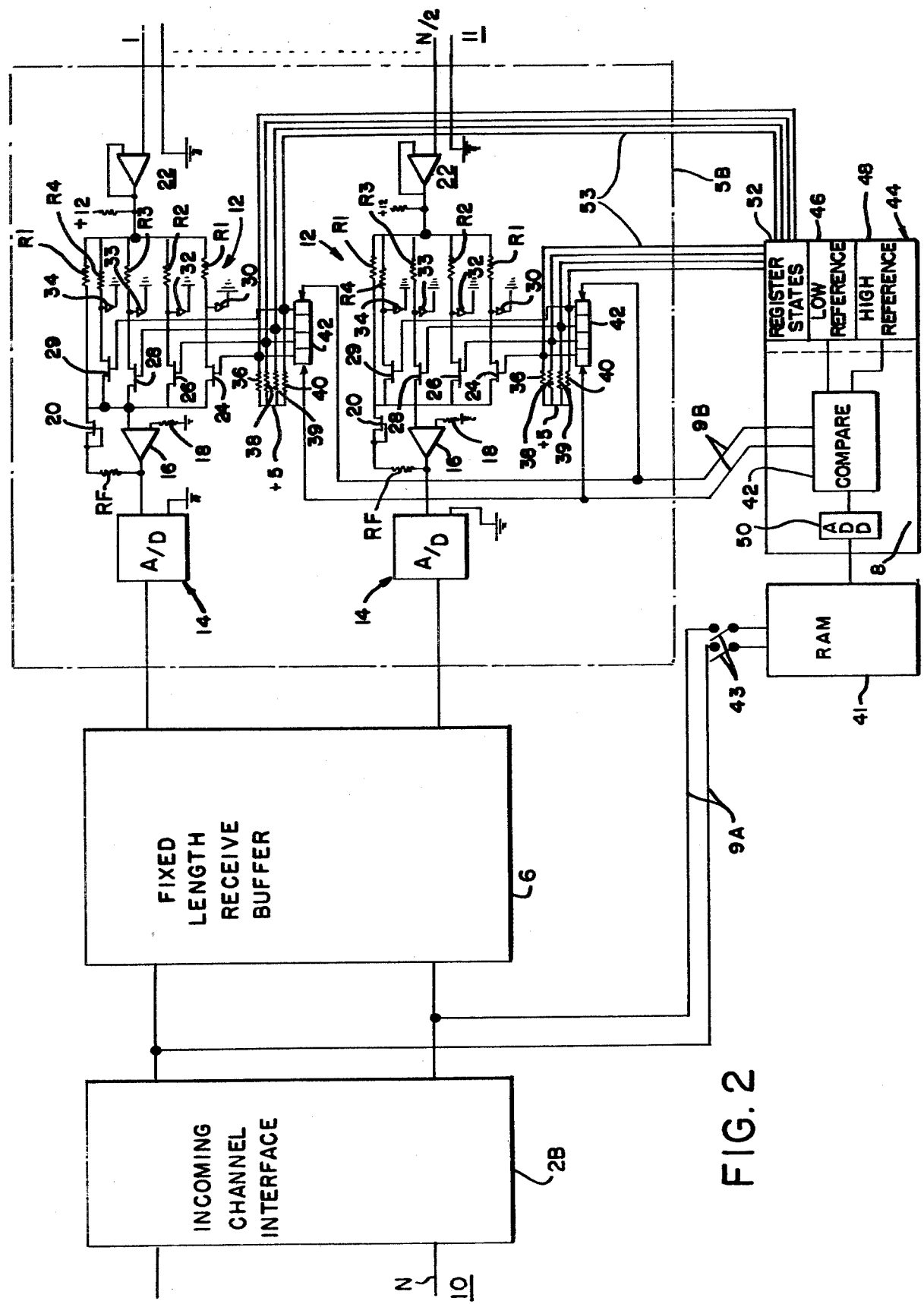

Referring now to FIG. 2, the incoming facility interface circuit 5B will be described in more detail. As mentioned above, the incoming facility interface circuit 5B comprises a plurality of controlled gain circuits which preferably comprise a plurality of variable gain amplifiers, two of which are shown at 12. Also, a plurality of analog to digital converters are shown at 14. In fact, one controlled gain circuit 12 and one analog-to-digital converter are provided for each of the N/2 transmission facilities. Each controlled gain circuit 12 preferably comprises an operational amplifier 16, the non-inverting input which is connected to ground through a resistor 18. The amplifiers 16 have a feedback loop comprising a resistor Rf and a field effect transistor 20, the gate and drain of which have been shorted. Incoming speech and test signals are applied to an input network of the amplifier 16 through the non-inverting input of buffer amplifiers 22.

The input network of the amplifier 16 comprises a resistor Ri. In parallel with the resistor Ri are four parallel branches, each containing the series combination of a resistor and a field effect transistor switch. The first branch comprises resistor R1 and transistor 24. The second is comprised of resistor R2 and transistor 26, the third, resistor R3 and transistor 28, and the fourth resistor R4 and transistor 29. Resistors R1, R2, R3 and R4 are also connected to ground by diodes 30, 32, 33 and 34. The gates of the transistors 24, 26, 28 and 29 are connected to a voltage source, such as a plus 5 volt source, through resistors 36, 38, 39 and 40 as shown. The gates of these transistors are also connected to one bit of a four-bit register 42. The values of the resistors 36, 38, 39 and 40 are chosen such that the transistors 24, 26, 28 and 29 do not conduct when their gates are connected to a register bit which is high.

The gain of each of the amplifiers 16 varies depending on which of the transistors 24, 26, 28 or 29 conduct.

It may be demonstrated that the gain of each of the controlled gain circuits 12 varies between a maximum defined by the expression:

$$G\ (max) = Rf\ (1/Ri + 1/R1 + 1/R2 + 1/R3 + 1/R4)$$

and a minimum defined by the expression:

$$G\ (min) = Rf\ (1/Ri)$$

depending upon the state of the four bit register 42. Moreover, since in the preferred embodiment, the counter is four bits wide, it has $2^4$ or 16 possible outputs and thus the gain may be a selected one of 16 possible steps.

The output of the controlled gain circuit 12 is applied to a plurality of analog-to-digital converters 14 which may, for example, comprise a device such as Model 2910 codec manufactured by Intel Corp. The analog-to-digital converters 14 provide a plurality of digital samples of incoming speech bursts or incoming test signals. In a preferred embodiment, the sampling rate is 8 Khz. Also, in a preferred embodiment, 256 samples are taken of each test signal.

When speech bursts are being received, switches 43 are opened and digital samples of incoming speech bursts are directed through the fixed length received buffer 6 as shown, and from there through incoming channel interface circuits 2B to one of the channels 10. However, in accordance with the present invention, if the system is to be operated in a test mode, the switch 43 corresponding to the facility 11 under test is closed. Preceding this event, a test signal of predetermined amplitude is generated at the far end and when received at the near end, digital samples of the received test signal are routed from the fixed length receive buffer 6 along the paths 9A to a random access memory (RAM) 41 which is preferably 256 words long and 8 bits wide. These samples are then retrieved from the memory 41 and directed to the control means 8.

At the control means 8, samples of the received test signal are compared by a central comparison means 42 against a reference signal which has been stored in the memory portion 44 of the control means 8. In a preferred embodiment, the reference signal comprises a low value shown schematically at 46 and a high value shown at 48. This low and high value define an acceptable amplitude range therebetween. Incoming test signals are summed over the 256 samples and compared against both the low and high values and if found to be outside of the acceptable range, a control signal is directed along feed-back path 9B to one of the registers 42 in order to increase or decrease the gain of the respective controlled gain circuit 12.

The particular arrangement by which digital samples of the incoming test signal and the reference signal are compared may vary. One possible arrangement which might be employed would be to compare each received sample with the corresponding stored reference sample. However, such an arrangement has not been practical because of the difficulty encountered in synchronizing the incoming samples with the proper stored reference signal sample. Therefore, in accordance with the present invention unsigned (rectified) incoming test signal samples are summed by an adder shown schematically at 50. The sum of these samples is then compared against a reference value which represents the sum of the optimum amplitudes (rectified) of samples of the test signal over a known range. However, it should be realized that other comparison arrangements could be employed. For example, it would be possible to compare the average unsigned amplitude of incoming test signal samples against an appropriate reference by dividing the output of the adder 50 by the number of samples which have been summed. In this example, the number of samples which have been summed is 256.

In another example, the RMS value of the incoming signal can be evaluated. Because one analog-to-digital coding process of the analog to to digital converter 14 may be a logarithmic process, each digital sample may represent the logarithm of the sampled voltage. Thus, by doubling that (unsigned) digital sample, which is equivalent to a left shift by 1 bit, the new digital value represents the logarithm of the square of the sampled analog signal.

If the anti-logarithm is taken, this new value represents the square of the sampled analog signal. Summing these values yields the sum-of-squares of the incoming signal. Thus, the RMS value of the signal can be evaluated by taking the square root of the sum above. This RMS value may then be compared against an appropriate reference.

Additionally, the present invention has the capability to allow the system to make measurements of other than test signals. For example, arbitrary waveforms, such as idle channel noise, data set transmitter levels, Touch-Tone transmission levels, etc. as may be applied at the far end of the transmission facilities 11. When received, they may be compared against an appropriate reference value which has been stored in the control means 8 and the results of this comparison may be made available to the user for diagnostic and performance evaluation purposes.

From the foregoing, it should be realized that only a single comparison means and a single reference signal may be employed and thus the possibility that one reference signal or comparison means might drift with respect to another is eliminated. Moreover, in accordance with the present invention, an array 52 may be provided in the memory portion 44 of the control means 8. This array 52 is connected by lines 53 to each of the registers 42 and may be used to store the outputs of all of the registers 42 therein. The output of the registers 42 provides a measure of the loss encountered in each of the facilities 11 and thus the condition of each of the private line transmission facilities may be easily determined by observing the states of each of the registers stored in array 52. For example, if the array 52 indicates that a particular facility has a particularly high loss thereon, it may be desirable to remove that facility from service and to replace or repair it.

While a particular embodiment of the present invention has been shown and described, it will, of course, be understood that various modifications may be made without departing from the principles of the invention. The appended claims, are, therefore, intended to cover any such modifications within the true spirit and scope of the invention.

What is claimed is:

1. In a time assigned speech interpolation communication system of the type having a plurality of transmission facilities interconnecting a near location and remote location, an automatic gain control circuit comprising:
   means at said remote location for selectively generating a test signal having a predetermined amplitude, said test signal being selectively applied to each of said transmission facilities;
   means at said near location for obtaining digital samples of the amplitude of the test signal received from the selected transmission facility;
   central means at said near location for providing a reference signal and for comparing said digital samples of said received test signal to said reference signal; and
   a controlled gain circuit in series with each transmission facility at said near location, said controlled gain circuit being responsive to said central means to increase or decrease the gain of said controlled gain circuit in accordance with the comparison of said digital samples of said test signal with said reference signal whereby the amplitude of said received test signal for each facility is equalized to that of each other facility.

2. The circuit of claim 1 wherein said central means comprises a first digital memory for storing digital reference values representing said reference signal.

3. The circuit of claim 2 wherein reference values comprise a low value and a high value defining an amplitude range therebetween and wherein said central means compares said digital samples of the amplitude of said received test signal with said low value and with said high value to determine whether said test signal samples are within said range.

4. The circuit of claim 3 wherein said gain is increased if the amplitude of said test signal samples is less than said low value and decreased if said samples are greater than said high value.

5. The circuit of claim 2 wherein said central means further comprises means for summing the digital samples of each received test signal.

6. The circuit of claim 5 wherein said central means compares the sum of said samples of the amplitude of each received test signal with said stored values.

7. The circuit of claim 5 wherein said central means further comprises a means for dividing said summed samples by the number of samples taken whereby the average amplitude of said samples is determined.

8. The circuit of claim 7 wherein said central means compares said average amplitude with said stored values.

9. The circuit of claim 1 wherein said central means further comprises a means for obtaining the root mean square of each received test signal.

10. The circuit of claim 1 wherein said means for generating said test signal comprises a memory for storing samples of the amplitude of said test signal, said samples being selectively retrieved.

11. The circuit of claim 1 wherein each of said controlled gain circuits comprises a means for registering the gain of that circuit whereby the loss in the transmission facility associated with that circuit may be recorded.

12. The circuit of claim 11 further comprising an array associated with said central means for storing the output of each of said register means.

13. In a time assigned speech interpolation communication system of the type having a plurality of transmission facilities interconnecting a near location and a remote location, an automatic gain control circuit of the type employing a means at said remote location for selectively generating a test signal having a predetermined amplitude, said test signal being selectively applied to each of said transmission facilities, said automatic gain control circuit comprising:

central means at said near location for providing a reference signal and for comparing the test signal received on the selected transmission facility to said reference signal; and a controlled gain circuit in series with each transmission facility at said near location, said controlled gain circuit being responsive to said central means to increase the gain of said controlled gain circuit if the amplitude of said received test signal is less than the amplitude of said reference signal and to decrease the gain of said controlled gain circuit if the amplitude of said received test signal is greater than the amplitude of said reference signal whereby the amplitude of said received test signal for each facility is equalized to that of each other facility.

* * * * *